US008476184B2

(12) United States Patent
Eijsbouts-Spickova et al.

(10) Patent No.: US 8,476,184 B2
(45) Date of Patent: Jul. 2, 2013

(54) BULK CATALYST COMPOSITION AND A PROCESS PREPARING THE BULK CATALYST COMPOSITION

(75) Inventors: Sona Eijsbouts-Spickova, Nieuwkuijk (NL); Robertus Gerardus Leliveld, Utrecht (NL); Bob Gerardus Oogjen, Almere (NL); Marinus Bruce Cerfontain, Amsterdam (NL); Johannes Cornelis Sitters, Amersfoort (NL)

(73) Assignee: Albemarle Corporation, Baton Rouge, LA (US)

( * ) Notice: Subject to any disclaimer, the term of this patent is extended or adjusted under 35 U.S.C. 154(b) by 986 days.

(21) Appl. No.: 12/091,679

(22) PCT Filed: Oct. 25, 2006

(86) PCT No.: PCT/EP2006/010296
§ 371 (c)(1),
(2), (4) Date: Jun. 23, 2008

(87) PCT Pub. No.: WO2007/048596
PCT Pub. Date: May 3, 2007

(65) Prior Publication Data
US 2008/0308462 A1    Dec. 18, 2008

Related U.S. Application Data

(60) Provisional application No. 60/760,838, filed on Jan. 18, 2006.

(30) Foreign Application Priority Data

Oct. 26, 2005  (EP) .................................... 05110051

(51) Int. Cl.
*C10G 45/04* (2006.01)
(52) U.S. Cl.
USPC ........... 502/313; 502/305; 502/314; 502/315; 502/316; 208/208 R; 208/216 R; 208/217
(58) Field of Classification Search
USPC .. 208/208 R, 213, 216 R, 243–244; 502/305, 502/313, 315
See application file for complete search history.

(56) References Cited

U.S. PATENT DOCUMENTS

| 5,122,258 A | 6/1992 | Eadie et al. | |
|---|---|---|---|
| 6,620,313 B1 * | 9/2003 | Demmin et al. | 208/112 |
| 2003/0102254 A1 | 6/2003 | Eijsbouts et al. | |
| 2005/0113250 A1 | 5/2005 | Schleicher et al. | |
| 2007/0084754 A1 * | 4/2007 | Soled et al. | 208/143 |

FOREIGN PATENT DOCUMENTS

| WO | WO 00/41810 A1 | | 7/2000 |
|---|---|---|---|
| WO | WO 00/41811 A1 | | 7/2000 |
| WO | WO 2005/005582 | * | 1/2005 |
| WO | WO 2005/033930 A2 | | 4/2005 |

OTHER PUBLICATIONS

Gates, B.C. et al. (1979). Chemistry of Catalytic Processes, McGraw-Hill, 464 pgs.*
Teh C. Ho, et al; "Deep HDS of Diesel Fuel:Chemistry and Catalysis"; Catalysis Today; 2004; p. 3-18; vol. 98; Elsevier B.V.; Amsterdam, Netherlands.
XP-002135661; Rudolf Zidek, et al; Catalyst for the Manufacture of Formaldehyde by Oxidation of Methanol; Chemical Abstracts + Indexes; 1976; p. 442; vol. 84; American Chemical Society; Columbus, Ohio, US.

* cited by examiner

*Primary Examiner* — Brian McCaig
(74) *Attorney, Agent, or Firm* — Jeremy J. Kliebert; Marcy M. Hoefling; James A. Jubinsky

(57) ABSTRACT

The invention relates to a bulk catalyst composition comprising metal oxidic particles comprising one or more Group VIII metals and two or more Group VIB metals, which bulk catalyst composition comprises first metal oxidic particles comprising one or more first Group VIII metals and one or more first Group VIB metals and separately prepared second metal oxidic particles comprising one or more second Group VIII metals and one or more second Group VIB metals, wherein the composition of Group VIB and Group VIII metals in the first and second metal oxidic particles are different, wherein the first and second oxidic bulk particles-are separately shaped to separate first and second shaped bulk catalyst particles, which are combined, preferably into a homogeneous blend, to form the bulk catalyst composition. The invention further relates to a process for the preparation of the bulk catalyst composition and to hydroprocessing a hydrocarbon feed using the bulk catalyst composition.

10 Claims, No Drawings

BULK CATALYST COMPOSITION AND A PROCESS PREPARING THE BULK CATALYST COMPOSITION

PRIORITY CLAIM

This application claims the foreign priority benefit of European Application No. 05110051.9, filed Oct. 26, 2005, and the domestic priority benefit of U.S. Provisional Application No. 60/760,838, filed Jan. 18, 2006.

The invention relates to a bulk catalyst composition comprising metal oxidic particles comprising one or more Group VIII metals and two or more Group VIB metals. The invention further relates to a process for preparing the bulk catalyst composition and to a hydroprocessing process using the bulk catalyst composition.

With a bulk catalyst is meant a catalyst comprising at least 60 wt % of metal oxidic particles (wt % calculated on the basis of metal oxides relative to the total-weight of the bulk catalyst) as distinguished from supported catalysts that have metal oxides deposited on a support material in amounts significantly less than 60 wt %. The bulk catalyst usually is in the form of shaped particles, for example produced by extrusion of a composition comprising the metal oxidic particles and 0-40 wt % of additional material, in particular a binder material. The bulk catalysts generally have a very high activity in hydroprocessing.

The term "hydroprocessing or hydrotreatment" in this context encompasses all processes in which a hydrocarbon feed is reacted with hydrogen at elevated temperature and elevated pressure, including processes such as hydrogenation, hydrodesulphurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. Hereafter, when referring to a high activity of the bulk catalyst according to the invention, in particular the hydrodesulphurization activity is implied unless otherwise indicated.

WO 00/41810 describes a bulk catalyst comprising bulk catalyst particles comprising two or more group VIB metals and one or more group VIII metals (hereafter also referred to as trimetallic bulk catalysts), in particular nickel/molybdenum/tungsten based catalysts. The comparative examples also describe bulk catalyst comprising only one group VIB metal and one or more group VIII metals (hereafter also referred to as bimetallic bulk catalysts). The trimetallic bulk catalysts have been reported to have a significantly higher catalytic activity than the bimetallic bulk catalyst. The trimetallic bulk catalyst particles are prepared in a process in which the metal compounds are combined in the presence of a protic liquid and wherein one or more metal compounds remains at least partly in the solid state during the entire process. The process wherein one of the metal compounds remains at least partly in the solid state and one other compound in the solute state is referred to as the solid-solute process. The process wherein the group VIB and the group VIII metal compounds remain at least partly in the solid state is referred to as the solid-solid process.

WO 00/41811 describes a trimetallic bulk hydroprocessing catalysts and a process for the manufacture thereof comprising the steps of combining and reacting at least one group VIII metal compound in solution with at least two group VIB metal compounds in solution in a reaction mixture to obtain a precipitate. This process is referred to as the solute-solute process. The comparative examples also describe bimetallic bulk catalysts. The trimetallic bulk catalysts have a significantly higher catalytic activity than the bimetallic bulk catalyst.

Different hydroprocessing conditions, different hydroprocessing feedstock or different hydroprocessing reactor equipment limitations may require a different composition of the trimetallic bulk catalyst composition. Irrespective of the type of production process used, from a chemical point of view a trimetallic bulk catalyst composition comprising two or more Group VIB metals is significantly more difficult to produce than a bimetallic catalyst. Changes in the composition of the desired bulk catalyst cannot always be directly translated into changes in composition of the starting metal compounds and/or changes in the process conditions. Apart from that, in the prior art process when switching from one to another bulk catalyst composition, there is considerable down time between the production runs leading to a reduced production capacity. Furthermore, when switching from one to another bulk catalyst composition, more waste is produced compared to a single production run, leading to more environmental burden and loss of precious metals.

The object of the invention is to provide a process for the manufacture of a bulk catalyst composition comprising two or more Group VIB metals and one or more Group VIII metals that does not have the disadvantages described above.

According to the invention there is provided a bulk catalyst composition comprising metal oxidic particles comprising two or more Group VIB metals and one or more Group VIII metals, which bulk catalyst composition comprises first metal oxidic particles comprising one or more first Group VIII metals and one or more first Group VIB metals and separately prepared second metal oxidic particles comprising one or more second Group VIII metals and one or more second Group VIB metals, wherein the composition of Group VIB and Group VIII metals in the first and second metal oxidic particles are different, wherein the first and second oxidic bulk particles are separately shaped to separate first and second shaped bulk catalyst particles, which are combined to form the bulk catalyst composition. In a preferred embodiment the bulk catalyst composition according to the invention comprises a blend, preferably a homogeneous blend, of the first and second shaped bulk catalyst particles, preferably extruded bulk catalyst particles.

The inventors have surprisingly found that the activity of the catalyst composition according to the invention is comparable to or can even be better than the activity of the prior art trimetallic catalysts. This is particularly surprising for the most preferred mode of the process according to the invention, in which one or preferably both of the first and second metal oxidic particles are bimetallic oxidic particles comprising only one group VIB metal, because according to the prior art the bimetallic bulk catalysts have a significantly lower catalytic activity.

This finding allows for a bulk catalyst composition preparation process that is much less complex from a chemical point of view and has optimal flexibility in changing to different bulk catalyst compositions. The first and second metal oxidic particles are produced in individually optimised standard longer production runs allowing an optimised high-quality of the obtained metal oxidic bulk catalyst particles and optimised high production capacity without the necessity of creating frequent downtime and extra waste when changing to a different composition of the bulk catalyst composition.

One further advantage of this embodiment is that it is possible to give the first and second shaped bulk catalyst different physical properties such that they can be separated from each other on the basis of said different physical properties. Different physical properties can for example be different shape, size, density etc and physical separation can be done using that difference for example by sieving. The bulk catalyst composition further has the distinct advantage that the group VIB metals can be more easily recovered in recycling. It is very difficult to reclaim group VIB metals from spend catalyst and even more difficult to separate one group VIB metal from the other. In the bulk catalyst composition one group VIB metal can be separated from the other by separating the shaped bulk catalyst particles comprising the metals.

In the bulk catalyst composition and process for the preparation thereof according to the invention, the first and second oxidic bulk particles are separately shaped to form a separate first and second shaped bulk catalyst, which are then combined to form a bulk catalyst composition, preferably a shaped bulk catalyst particle blend composition. Details of the shaping process are described below. The bulk catalyst composition according to the invention comprises first and second shaped bulk catalyst particles having a different composition, combined in such relative amounts to reach the desired overall trimetallic composition. The first and second shaped bulk catalyst particles are combined in relative amounts based on the envisaged application of the catalyst, preferably the molybdenum to tungsten mole ratio in the bulk catalyst composition is between 1:9 and 9:1.

The composition of Group VIB and Group VIII metals in the first and second shaped bulk catalyst particles must be different. Preferably, the Group VIB and/or Group VIII metals in the first shaped bulk catalyst particles are different from the Group VIB and/or Group VIII metals in the second shaped bulk catalyst particles. It is preferred that the Group VIB metals in the first shaped bulk catalyst particles are different from the Group VIB metals in the second shaped bulk catalyst particles.

The bulk catalyst preferably comprises only one Group VIII metal, preferably non-noble metals cobalt, nickel or iron, but optionally may comprise an additional Group VIII metal. It is further preferred that the one or more Group VIII metals in the first oxidic metal particles are the same as in the second metal oxidic particles.

It is preferred that the first metal oxidic particles comprise Molybdenum as the main Group VIB metal and the second metal oxidic particles comprise tungsten as the main Group VIB metal. It is most preferred that the Group VIII metal in both the first and second metal oxidic particles is the same, preferably nickel or cobalt, and the Group VIB metal in the first oxidic bulk catalyst is substantially only Molybdenum and in the second oxidic bulk catalyst is substantially only tungsten. A bimetallic bulk catalyst can be distinguished from a trimetallic catalyst in that it comprises less than 10 mole % (relative to the total amount of Group VIB metals) but preferably has substantially only one Group VIB metal. The term "substantially only" implies that the catalyst most preferably has no other, but may have an insubstantial amount of another Group VIB or group VIII metal, preferably less than 5, more preferably less than 3 and most preferably less than 1 mole % (relative to the total of the group VIB or group VIII metals). Most preferably the first and/or second metal oxidic particles are substantially bimetallic NiMo and/or NiW oxidic particles respectively. In an alternative embodiment, the first metal oxidic particles comprise 2 or more group VIB metals and one or more Group VIII metals and wherein the second oxidic particles comprise substantially only one Group VIB metal and one or more Group VIII metals, preferably the first metal oxidic particles are substantially trimetallic NiMoW particles and the second metal oxidic particles are substantially bimetallic NiW and/or NiMo metal oxidic particles.

The bulk catalyst may optionally further comprise preferably less than 10%, more preferably less than 9%, even more preferably less than 7%, and most preferably below 5% (mole % relative to the total of the Group VIB metals) of an additional other metal, in particular a Group V metal, preferably Niobium. Although it is less preferred, the catalyst may contain minor amounts of other metals.

In the most important embodiment of the bulk catalyst composition according to the invention the first and second oxidic bulk particles are both freshly prepared. However, it is envisaged that the invention can be advantageously used as a process for changing the catalytic properties of a previously prepared finished shaped bulk catalyst to change the properties in view of different requirements. In particular, in the bulk catalyst composition the first oxidic bulk particles can be provided at least in part in the form of spent, reject or regenerated spent bulk catalyst and the second metal oxidic particles is freshly prepared. Spent, reject or regenerated spent bulk catalysts can be upgraded to meet the requirements for use in specific hydrotreatment conditions.

The first and second shaped bulk catalysts comprising first and second metal oxidic particles can be prepared in various different ways described in the prior art. The invention also relates to a process for the preparation of a bulk catalyst composition according to the invention said process comprising: providing first and second shaped bulk particles wherein one or both of the first and second shaped bulk particles have been separately prepared in a process comprising
  i) Preparing a reaction mixture comprising one or more first compounds comprising one or more Group VIII metals, preferably Ni or Co, and one of more second compound comprising one or more Group VIB metals, preferably molybdenum or tungsten in the presence of a protic liquid,
  ii) reacting the first and second compounds to form metal oxidic bulk particles,
  iii) shaping the metal oxidic bulk particles to shaped bulk catalyst particles, followed by combining the first and second shaped bulk catalyst particles to form the bulk catalyst composition.

In view of obtaining a high catalytic activity of the obtained catalyst and a high yield it is preferred that the first and second metal compounds remain at least partly in the solid state during the entire reaction.

The process for preparing the shaped bulk catalyst particles may further comprise one or more of the following process steps:
  i) compositing of the metal oxidic particles with 0 to 40 wt % of one or more materials selected from the group of binder materials, conventional hydroprocessing catalysts, acidic promoters, or mixtures thereof before, during or after the combining and/or reacting of the metal compounds,
  ii) spray-drying, (flash) drying, milling, kneading, slurry-mixing, dry or wet mixing, or combinations thereof
  iii) drying and/or thermally treating, and
  iv) sulphiding.

Details of the process steps for the preparation of the first and second metal oxidic particles are described in the prior art, in particular in WO 00/41810 or WO 00/41811, which are herewith incorporated by reference.

Although a heat treatment is not essential, it is essential that the temperature during heat treatment of the bulk catalyst composition, in particular the metal oxidic particles in the bulk catalyst composition, is below a temperature where transition to an inactive structure occurs. This applies to any and all heat treatment steps in the production process of the bulk catalyst. The skilled man can determine the maximum heat treatment temperature for a given catalyst composition. This applies in particular also to heat treatment of shaped bulk catalyst particles after compositing and shaping. Preferably, the bulk catalyst is heat treated below 450° C., more preferably below 400° C., even more preferably below 375° C. and most preferably below 350° C.

The shaped bulk catalyst particles comprise at least 60 wt % of metal oxidic particles (wt % calculated on the basis of metal oxides relative to the total weight of the bulk catalyst) as distinguished from supported catalysts that have metal oxides deposited on a support material in amounts significantly less than 60 wt %. In view of obtaining high catalytic activity it is preferred that the bulk catalyst according to the invention comprises at least 70 wt %, more preferably at least 75 wt %, even more preferably at least 80 wt % and most preferably at least 85 wt % metal oxidic particles. The remaining 0 to 40 wt % can be one or more materials selected from the group of binder materials, conventional hydroprocessing catalysts, acidic promoters and cracking components. In shaped bulk catalyst it is preferred to composite the metal oxidic particles with binder material to improve the side crushing strength of the shaped particles.

Preferably, the metal oxidic particles are shaped by extrusion, pilling or pelletising to form shaped bulk catalyst particles. In this shaping process the metal oxidic catalyst particles are preferably composited with a binder. In an alternative embodiment in the bulk catalyst composition according to the invention the first and/or second shaped bulk catalyst particles can be agglomerated or shaped by grinding (directly after the reaction step or after an agglomeration step) preferably followed by sieving to a narrow particle size distribution. In yet another alternative embodiment the first and second shaped bulk catalyst particles can be shaped by spray drying, optionally with a binder and optionally followed by sieving to a narrow particle size distribution. The ground or spray dried bulk catalyst composition typically has very small particle size and can be used in a slurry hydrotreatment process. The invention also relates to the use of this particular embodiment in a slurry hydrotreatment process and to the slurry hydroprocessing of a hydrocarbon feedstock by a process comprising contacting the feedstock with hydrogen in the presence of a catalytically effective amount of the bulk catalyst composition described above under catalytic conversion conditions, wherein the bulk catalyst composition is present in the feedstock as a slurry.

The first and second shaped bulk catalysts are preferably combined by blending the particles to a homogeneous mixture. However it is also envisaged to combine the first and second shaped bulk catalyst in at least two consecutive layers wherein the layers have a different relative amount of the first and second shaped bulk catalysts or in one layer having in a direction perpendicular to the layer a composition gradient along which the relative amount of the first and second shaped bulk catalysts gradually changes.

The invention further relates to the bulk catalyst or sulphided bulk catalyst composition according to the invention, wherein said catalyst composition comprises at least 50, preferably more than 60, 65 or even 70% (mole % relative to the total of Group VIB metals) of tungsten to its use as hydrodesulphurisation catalyst in hydroprocessing of a hydrocarbon feedstock and to a hydroprocessing process using said catalyst composition. It was found that said tungsten rich catalyst is particularly active in hydrodesulphurisation. Preferably, this catalyst composition is used at higher pressure above 20, preferably more than 40, and even more preferably more than 50 bar and most preferably more than 60 bar. It was found that the activity of this catalyst is higher at higher pressures.

Alternatively, the invention relates to the shaped bulk catalyst or sulphided bulk catalyst wherein said catalyst comprises at least 50, preferably more than 60, 65 or even 70% molybdenum (mole % relative to the total of Group VIB metals) and to its use as a hydrodenitrogenation catalyst in hydroprocessing of a hydrocarbon feedstock feedstock and to a hydroprocessing process using said catalyst composition. It was found that said molybdenum rich catalyst is particularly active in hydrodenitrogenation.

The invention also relates to a sulphided bulk catalyst composition comprising a bulk catalyst composition as described above that has been sulphided and to the use of the bulk catalyst composition or sulphided bulk catalyst composition in hydroprocessing of a hydrocarbon feedstock comprising sulphur and nitrogen containing organic compounds. The invention also relates to hydroprocessing a hydrocarbon feedstock by a process comprising contacting the feedstock with hydrogen in the presence of a catalytically effective amount of the bulk catalyst composition according to the invention under catalytic conversion conditions. Further, the invention relates to the use of bimetallic Nickel-tungsten or Nickel-molybdenum shaped bulk catalyst particles in the bulk catalyst composition in the preparation thereof or in the hydroprocessing process according to the invention.

The invention will be further illustrated by the Examples and comparative experiments described below.

COMPARATIVE EXPERIMENT 1

C1: NiMoW R3

115.2 g of MoO3 (0.8 mole Mo, ex. Aldrich) and 200 g of tungstic acid H2WO4 (0.8 mole W, ex. Aldrich) were slurried in 6400 ml of water (suspension A) and heated to 90° C. 282.4 g of nickel hydroxycarbonate 2NiCO3*3Ni(OH)2*4H2O (2.4 mole of Ni, ex. Aldrich) were suspended in 1600 ml of water and heated to 90° C. (suspension B). The nickel hydroxycarbonate used in this and the other examples had a B. E. T. surface area of 239 m$^2$/g. Suspension B was added to suspension A in 10 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 2.5 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour.

The catalyst was sulphided and tested using the procedure from Diesel test procedure D1 described below and the conversion results are summarised in Table 3.

COMPARATIVE EXPERIMENT 2

C2: Ni1.5W0.5Mo0.5 Made from Oxides

A catalyst was prepared by wet mixing of unreacted oxides of Group VIB and Group VIII metal components: a catalyst was prepared using 185.6 g of WO$_3$ (0.8 mole W, ex. Aldrich), 115.2 g of MoO$_3$ (0.8 mole Mo, ex. Aldrich) and 180 g of NiO (2.4 mole Ni, ex. Aldrich). The wet oxide mix was mixed with 2.5 wt. % of a binder based on the total weight of the catalyst composition. The metal oxidic particles were extruded, dried, calcined and sulphided and subsequently tested using the procedure from Diesel test procedure D1 described below. The test results are summarised in Table 3.

COMPARATIVE EXPERIMENT 3

C3: Ni1.5W1 R3 Cake

A filter cake was prepared as described in C1, except that only one Group VIB metal component was used: a catalyst was prepared using 400 g of tungstic acid (1.6 mole W, ex. Aldrich) and 282.4 g of nickel hydroxycarbonate (2.4 mole Ni). The yield was about 99%. The metal oxidic particles were extruded, dried, calcined and sulphided and subsequently tested using the procedure from Diesel test procedure D1 described below. The test results are summarised in Table 3.

COMPARATIVE EXPERIMENT 4

C4: Ni1.5 Mo1 R3 Cake

A filter cake was prepared as described in Comparative Experiment 1 (C1), except that only one Group VIB metal component was applied: a catalyst was prepared using 230.4 g of molybdenum trioxide (1.6 mole Mo, ex. Aldrich) and 282.4 g of nickel hydroxycarbonate (2.4 mole Ni). The yield was about 85%. The metal oxidic particles were extruded, dried, calcined and sulphided and subsequently tested using the procedure from Diesel test procedure D1 described below. The test results are summarised in Table 3.

EXAMPLE 5

E5: Ni1.5W1+Ni1.5 Mo1 Extrudate Mix R3 Catalysts

The Ni—W shaped catalyst prepared in C3 was blended with the Ni—Mo shaped catalyst prepared in C4 to prepare a shaped bulk catalyst particle blend composition. The amount of the respective catalysts was adjusted as to obtain the Ni to Mo to W mole ratio of 1.5 to 0.5 to 0.5 in the final particle blend (amount corresponding to 341.6 g (dry base) of Ni—W cake (C3) and 256 g Ni—Mo cake (dry base, C4)). The thus obtained shaped bulk catalyst particle blend composition was sulphided and tested using the procedure from Diesel test procedure D1. The test results are summarised in Table 3. Example E5 surprisingly shows, as opposed to the teaching of the cited prior art, that it is not necessary in a trimetallic catalyst to have both Group VIB and the group VIII metal present together during the reaction of the compounds to the metal oxidic particles. Moreover, the two group VIB metals do not even need to be in the same catalyst particle. More surprisingly it was demonstrated that the bulk catalyst composition according to the invention has an even higher activity both in hydrodesulphurisation (HDS) as in hydrodenitrogenation (HDN).

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested the catalysts were pre-sulphided via liquid phase presulphiding using the feed described in Table 1, which had been spiked with dimethyldisulfide to a total sulfur content of 3.7 wt. %. The presulphided catalysts were then tested in the hydrotreating of a diesel feedstock having the properties shown in Table 1:

TABLE 1

| | GAS OIL FEEDSTOCK |
|---|---|
| Sulphur content (% wt) | 1.24 |
| Nitrogen content (ppmwt) | 86 |
| Mono aromatics (% wt) | 16.5 |
| Di-aromatics (% wt) | 10.8 |
| Di+-aromatics (% wt) | 0.8 |
| Total aromatics (% wt) | 28.1 |
| Simulated Distillation ASTM-D 86 | |
| Initial Boiling Point | 184 |
| 5% Volume (° C.) | 218.6 |
| 10% Volume (° C.) | 231.1 |
| 20% Volume (° C.) | 250.9 |
| 30% Volume (° C.) | 264.8 |
| 40% Volume (° C.) | 276.4 |
| 50% Volume (° C.) | 286.8 |
| 60% Volume (° C.) | 298.1 |
| 70% Volume (° C.) | 309.7 |
| 80% Volume (° C.) | 324.7 |
| 90% Volume (° C.) | 345.3 |
| 95% Volume (° C.) | 360.3 |
| Final Boiling Point (° C.) | 373.8 |

The catalysts were tested under the two conditions shown in Table 2.

TABLE 2

| | Presulphiding | Condition 1 | Condition 2 |
|---|---|---|---|
| Temperature (° C.) | 315 | 320 | 340 |
| Pressure (bar) | 30 | 40 | 20 |
| H2 to oil ratio (Nl/l) | 200 | 300 | 300 |
| LHSV (1/h) | 3.0 | 2.0 | 1.5 |

The diesel hydroprocessing test results are given in Table 3 wherein RVA and RWA are relative volume activity and relative weight activity, respectively, based on the total catalyst amount loaded in the reactor. HDN is hydrodenitrogenation and HDS is hydrodesulphurisation. CBD means compacted bulk density of the catalyst. R3 indicates the solid-solid reaction process wherein both the first and second metal compounds are at least partly solid during the reaction. The diesel test procedure D1 was performed using two different temperature and pressure conditions 1 and 2. The postfix 1 or 2 (as for example in RWA1 and RWA2) refer to the test condition 1 and 2 respectively. The RWA/RVA values of the reference catalyst C1 in diesel test procedure D1 (C1 in Table 3) were defined as 100. All other RWA/RVA values are calculated relative to this reference catalyst.

TABLE 3

Results of activity tests

| sample | composition | test process | extrudates | RWA HDS1 | RWA HDS2 | RWA HDN1 | RWA HDN2 |
|---|---|---|---|---|---|---|---|
| C1 | Ni1.5Mo0.5W0.5 | R3 | D1 | 100 | 100 | 100 | 100 |
| C2 | Ni1.5Mo0.5W0.5-made from oxides | comix | D1 | 14 | 27 | 33 | 30 |
| C3 | Ni1.5W1 | R3 | D1 | 139 | 92 | 106 | 87 |

TABLE 3-continued

Results of activity tests

| sample | composition | process | test extrudates | RWA HDS1 | RWA HDS2 | RWA HDN1 | RWA HDN2 |
|---|---|---|---|---|---|---|---|
| C4 | Ni1.5Mo1 | R3 | D1 | 59 | 82 | 169 | 104 |
| E1 | Particle mix Ni1.5W1 + Ni1.5Mo1 | R3 | D1 | 132 | 87 | 133 | 97 |

The invention claimed is:

1. A bulk catalyst composition comprising metal oxide particles, which bulk catalyst composition comprises
   i. first metal oxidic particles comprising one or more first Group VIII metals and one or more first Group VIB metals, and
   ii. separately prepared second metal oxidic particles comprising one or more second Group VIII metals and one or more second Group VIB metals,
   wherein the Group VIB and Group VIII metals in the first and second metal oxidic particles are different, wherein the first and second metal oxidic particles are separately shaped into first and second shaped bulk catalyst particles, which are combined to form the bulk catalyst composition.

2. The bulk catalyst composition according to claim 1 wherein the first and/or second shaped bulk catalyst particles have been shaped by extrusion, pilling or pelletising.

3. The bulk catalyst composition according to claim 1 wherein the first and/or second shaped bulk catalyst particles have been shaped by spray drying or by grinding, optionally followed by sieving.

4. The bulk catalyst composition according to claim 1, wherein the first metal oxidic particles comprise molybdenum and the second metal oxidic particles comprise tungsten.

5. The bulk catalyst composition according to claim 4, wherein the first and second shaped bulk catalyst particles are combined in such relative amounts that the molybdenum to tungsten mole ratio in the bulk catalyst composition is between 1:9 and 9:1.

6. The bulk catalyst composition according to claim 1, wherein the first metal oxidic particles comprise 2 or more group VIB metals and one or more Group VIII metals, and wherein the second oxidic particles comprise essentially one Group VIB metal and one or more Group VIII metals.

7. The bulk catalyst composition according to claim 1, wherein the first and second shaped bulk catalyst particles are both freshly prepared.

8. The bulk catalyst composition according to claim 1, wherein one of the first or second shaped bulk catalyst particles are spent, reject or regenerated spent bulk catalyst particles and the other of the first or second shaped bulk catalyst particles is freshly prepared.

9. The bulk catalyst according to claim 1, wherein one or both of the first and second shaped bulk particles have been separately prepared in a process comprising the steps of:
   i) preparing a reaction mixture comprising one or more first compounds comprising one or more Group VIII metals, and one of more second compound comprising one or more Group VIB metals in the presence of a protic liquid,
   ii) reacting the first and second compounds to form metal oxidic bulk particles,
   iii) shaping the metal oxidic bulk particles to shaped bulk catalyst particles, followed by combining the first and second shaped bulk catalyst particles to form the bulk catalyst composition.

10. A process for hydroprocessing of a hydrocarbon feedstock comprising the step of contacting the hydrocarbon feedstock with the bulk catalyst composition of claim 1.

* * * * *

UNITED STATES PATENT AND TRADEMARK OFFICE
CERTIFICATE OF CORRECTION

PATENT NO. : 8,476,184 B2  Page 1 of 1
APPLICATION NO. : 12/091679
DATED : July 2, 2013
INVENTOR(S) : Eijsbouts-Spickova et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1378 days.

Signed and Sealed this

Eighth Day of September, 2015

Michelle K. Lee
*Director of the United States Patent and Trademark Office*